United States Patent [19]

Brandl et al.

[11] 3,875,231

[45] Apr. 1, 1975

[54] RECOVERY OF REACTION PRODUCTS OF HYDRAZINE AND CARBONYL COMPOUNDS

[75] Inventors: Herman Brandl, Leichlingen; Hermann Kaiser, Leverkusen; Hans Richert, Leverkusen; Franz Rozanski, Leverkusen; Herbert Suchy, Leverkusen; Theodor Hunecke, Porz-Urbach, all of Germany

[73] Assignee: Bayer Aktiengesellschaft, Leverkusen, Germany

[22] Filed: Nov. 11, 1971

[21] Appl. No.: 197,929

[30] Foreign Application Priority Data
Nov. 17, 1970 Germany.............................. 2056357

[52] U.S. Cl............................................. 260/566 B
[51] Int. Cl............................................. C07c 119/00
[58] Field of Search .................................. 260/566 B

[56] References Cited
UNITED STATES PATENTS

| | | | |
|---|---|---|---|
| 3,382,041 | 5/1968 | Needham et al................ | 260/566 B |
| 3,382,281 | 5/1968 | Jankowski et al.............. | 260/566 B |

FOREIGN PATENTS OR APPLICATIONS

| | | | |
|---|---|---|---|
| 1,122,034 | 6/1972 | Great Britain .................. | 260/566 B |

OTHER PUBLICATIONS

Vogel "Practical Organic Chem." Longmans, Green (1949) page 44.

Treybal "Liquid Extraction" McGraw-Hill (1963) pages 23–25.

Miall "A New Dictionary of Chemistry," Interscience (1962) p. 481.

The Van Nostrand Chemists' Dictionary (1953) page 620.

*Primary Examiner*—Donald G. Daus
*Assistant Examiner*—D. B. Springer
*Attorney, Agent, or Firm*—Burgess, Dinklage & Sprung

[57] ABSTRACT

In the preparation of reaction products of hydrazine and carbonyl compounds, such as azines, by reacting ammonia with chlorine or compounds containing active chlorine, e.g. bleaching lye or chloramine, in aqueous phase and in the presence of a carbonyl compound, in accordance with the invention the hydrazine reaction product is recovered by having present a hydrophilic substance such as sodium or calcium chloride in amount sufficient to cause separation of the product into two phases, the lower of which is aqueous and the upper of which is organic and contains the hydrazine reaction product. If the hydrophilic substance is non-acidic so it will not interfere with the reaction, it can even be present from the outset.

4 Claims, No Drawings

RECOVERY OF REACTION PRODUCTS OF HYDRAZINE AND CARBONYL COMPOUNDS

This invention relates to a process for the preparation of reaction products of hydrazine with carbonyl compounds by the reaction of active chlorine with ammonia in an aqueous phase in the presence of a carbonyl compound. These reaction products may be worked up to hydrazine in known manner.

Hydrazine, which as is well known is obtained by the reaction of chlorine with ammonia via chloramine as the intermediate stage is obtained in most processes in the form of dilute aqueous solutions from which the pure hydrazine can be isolated only with considerable expenditure of energy. Thus, for example, it is known to distill the hydrazine from the reaction mixture. Hydrazine forms a constant boiling mixture with water in a molar ratio of about 1:1, which is known as hydrazine hydrate. The boiling point of this azeotropic mixture is above 100°C. Salt-containing solutions which are obtained, e.g. in the Raschig synthesis of hydrazine, must therefore be evaporated to dryness in order to obtain hydrazine hydrate.

It has therefore been proposed to react hydrazine with a water-soluble low-molecular weight carbonyl compound, especially acetone, to convert it into a reaction product of hydrazine and the corresponding carbonyl compound, e.g. into the corresponding azine. These compounds form azeotropic mixtures with water which boil at a temperature below 100°C. They can therefore be distilled from dilute aqueous solutions which still contain salts and other dissolved substances. Even this process involves considerable expenditure of energy.

In German Pat. No. 1,082,889 there has been disclosed a process for the preparation of hydrazine by the reaction of gaseous chlorine with excess gasous ammonia in the presence of a ketone or an aldehyde, which process consists in reacting the mixture of excess ammonia and the particular ketone or aldehyde with chlorine in the gaseous phase, ammonium chloride, ammonia and the excess ketone or excess aldehyde being removed from the reaction mixture, and the resulting reaction product being worked up to hydrazine. This process, which is operated exclusively in the gaseous phase, is also relatively difficult to handle.

It has also been proposed to obtain hydrazine with the aid of aldehydes or ketones which are immiscible with water by extracting the hydrazine from the aqueous phase in the form of the corresponding azine. Examples of aldehydes which have been mentioned for this purpose are benzaldehyde and propionaldehyde (see L. F. Audrieth and B. A. Ogg, The Chemistry of Hydrazine, page 45, 1951, John Wiley & Sons, Inc., New York). For economical reasons, however, the use of such solvents would hardly be considered for a commercial process.

It is accordingly an object of the present invention to provide a simple, inexpensive process for recovering a reaction product of hydrazine and a carbonyl compound.

In accordance with the present invention, it has surprisingly been found that the processes of working up by distillation previously employed for the preparation of hydrazine may be dispensed with if a solution containing the reaction product of hydrazine with a carbonyl compound is rendered substantially insoluble for the resulting hydrazine-carbonyl compound by the addition of a hydrophilic substance such as a salt into a liquid, a two-phase system forming in which the hydrazine is concentrated in the less aqueous phase. The degree of distribution of hydrazine or of the reaction product of hydrazine with the carbonyl compound between the less aqueous phase and the more highly aqueous phase depends on the degree to which the carbonyl compound used is miscible with water and on the concentration of the hydrophilic substance. If the concentration of the hydrophilic substances is low, as is the case when synthesis is carried out in the conventional manner, and if the carbonyl compound used is completely or partly miscible with water, then either no diphasic reaction solutions are obtained at all or the reaction products are distributed in both phases.

In the presence of a carbonyl compound which is completely or partly miscible with water and of a suitably high salt concentration, a diphasic system is formed in which hydrazine or the reaction products of hydrazine with the carbonyl compound are highly concentrated in the less aqueous phase. The less aqueous phase has almost the same composition as an azine. Salts and ammonia remain in the highly aqueous phase.

The most suitable starting materials for preparing the initial reaction product of hydrazine and carbonyl compound according to the invention are bleaching lye and ammonia which are used as components for the Raschig process, but intermediate products already formed from the reaction between active chlorine and ammonia, e.g. chloramine, may also be used for the process according to the invention, and aqueous solutions already containing hydrazine are also suitable.

Bleaching lye containing from about 50 to 175 g of active chlorine per liter may be reacted directly with the ammonia component which is added either as an aqueous ammonia solution having a concentration of from about 5 to 30% by weight of $NH_3$ or directly in the form of $NH_3$ gas. The proportion of ammonia to chlorine should be approximately in the region of 6 to 20 moles of ammonia per mole of active chlorine. The reaction is advantageously carried out at a temperature in the range of from about 0°C to 100°C, preferably about 30°C to 60°C, at normal or elevated pressure.

The reaction is generally carried out in the presence of the carbonyl compound but if desired a carbonyl component may be added to an aqueous hydrazine solution already formed. The carbonyl compound is then advantageously added in such an amount that the reaction results in at least a proportion of carbonyl compound to hydrazine required for the formation of azine, i.e., carbonyl compound: hydrazine = 2.

Hydrophilic substances which are not acid in reaction may in addition be added to the reaction system. These additives, which may be added in any amounts up to the saturation concentration, that is to say up to the formation of a ground sediment, enable the hydrazine component to be highly concentrated in the nonaqueous phase even if the carbonyl compounds used are normally completely or at least to a considerable extent miscible with water.

After completion of the reaction, the two phases are brought into intimate contact with each other by shaking, stirring or other suitable methods, using conventional apparatus for this purpose.

When the two phases are completely separated, the hydrazine component or the ketazine or aldazine is found almost quantitatively in the relatively nonaqueous phase. Separation of the non-aqueous from the aqueous phase may be carried out in a separation funnel. Conventional apparatus for phase separation, e.g. extraction columns, may be used for carrying out the process of the invention on a commercial scale. Mixing and phase separation may also be carried out in an apparatus of the mixer-settler type or in a counter-current extraction column.

The carbonyl compounds used are substances of the following general formula

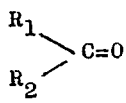

wherein $R_1$ represents hydrogen, alkyl or aryl, $R_2$ represents alkyl or aryl or $R_1$ and $R_2$ together represent a cycloaliphatic radical.

The radicals $R_1$ and $R_2$ may also be substituted.

It is preferred to use carbonyl compounds such as acetone, methylethyl ketone, methyl isobutyl ketone, cyclohexanone, cyclopentanone, propionaldehyde.

Even if the carbonyl compounds used are partly or completely miscible with water, the process according to the invention enables separation into the two phases to be achieved economically by the presence of hydrophilic substances in the aqueous phase or in the reaction mixture.

Any substances which are not acids in reaction and which are water-soluble to a certain extent are suitable for use as hydrophilic substances. Electrolytes such as NaCl, KCl or $CaCl_2$ are particularly suitable as well as substances which are alkaline in reaction such as NaOH or $NH_3$.

With increasing excess of the carbonyl compound at the stage of phase separation, higher yields of azine separating in the organic phase are obtained.

The process according to the invention may be carried out either continuously or intermittently. In the continuous process, it is found to be particularly advantageous to recycle the aqueous ammoniacal salt solution, which is almost free from azine, after the water and the salt formed in the reaction has been extracted.

The products obtained according to the invention from dilute hydrazine solutions or in the case of hydrazine synthesis in a separate non-aqueous phase may be directly converted into hydrazine or hydrazine derivatives in known manner, generally without any further working up operations. The carbonyl compound liberated is advantageously used for recovering additional products according to the invention.

The process according to the invention will now be described more fully with the aid of the following examples.

EXAMPLE 1 a 200 ml portions of an aqueous solution containing 5.0 grams (0.1 mole) of hydrazine hydrate and varying quantities of NaCl were vigorously mixed with 0.22 mole of a. 16 g of methylethyl ketone; or b. 13 g of propionaldehyde at room temperature. The percentage of hydrazine found in the non-aqueous phase after phase separation, based on the amount of hydrazine in the starting solution, is shown below for different amounts of NaCl in the starting solution:

| 13 g of NaCl | a) | 61.6% | b) | 48.7% |
| 50 g of NaCl | a) | 92.1% | b) | 90.1% |

EXAMPLE 1 b 200 ml portions of aqueous solution saturated with NaCl and containing NaCl ground sediment and having a hydrazine hydrate content of 5.0 g (0.1 mole) were vigorously mixed with the following amounts of acetone at about 50°C:

a. 0.22 mole = 12.7 g;

b. 0.44 mole = 25.4 6; and c. 0.88 mole = 50.8 g.

The following percentages of hydrazine hydrate, based on the original amount of hydrazine hydrate, were found in the non-aqueous phase after phase separation:

a. 41.0%;

b. 55.5%; and c. 93.5%.

EXAMPLE 2 a

When different substances were present in solution, vigorous mixing of 200 ml of aqueous solution of 5.0 g (0.1 mole) of hydrazine hydrate with 16.0 g = 0.22 mole of methylethyl ketone resulted in the following hydrazine contents (based on the starting solution) in the non-aqueous phase: without additives - no phase separation

| 26.2 | g $NH_3$ | 28.2% |
| 26.2 | g $NH_3$ + 13 g NaCl | 61.5% |
| 50 | g $CaCl_2$ | 76.1% |
| 50 | g NaOH | 85.2% |

The process according to the invention may also be applied to hydrazine solutions which are obtained by the urea synthesis process, i.e., by the reaction of urea with bleaching lye followed by the addition of NaOH. These solutions contain $Na_2CO_3$ in addition to hydrazine and NaCl and their use is illustrated in the following examples.

EXAMPLE 2 b

Approximately 2,500 ml of a urea synthesis solution containing 107.9 g of hydrazine hydrate were mixed with 660 ml of acetone at 40°C. The resulting mixture separated into two phases when left to stand. The aqueous phase was again treated with 165 ml of acetone. The following results were obtained on analysis:

| | Hydrazine hydrate | Acetone | Molar ratio |
| --- | --- | --- | --- |
| Upper, non-aqueous phases | 82.3 g | 444.6 g | 4.6 |
| aqueous phase (containing NaCl and $Na_2CO_3$) | 26.4 g | 161.0 g | 5.3 |

76% of the hydrazine was transferred to non-aqueous acetone phase by a separation carried out in two stages.

EXAMPLE 3

1,200 ml of aqueous ammonia solution containing approximately 14 moles of $NH_3$ and (a) 0; (b) 200 and (c) 375 g of NaCl were reacted with from 15 to 20 ppm of glue and 400 ml of aqueous bleaching lye containing 155 g per liter (0.87 mole) of active chlorine and 140 g (1.95 mole) of methylethyl ketone (molar ratio of ketone: active chlorine = 2.2:1) at 30°C to 35°C with vigorous stirring. The reaction mixture was then heated to 45°C and stirred for a further one-half hour. The reaction mixture separated into two phases. The hydrazine-ketone compounds, calculated as hydrazine hydrate (HyHy) were distributed in the two phases as follows:

|  | a) | b) | c) |
|---|---|---|---|
| When using the following amounts of NaCl | 0 | 200 g | 375 |
| upper phase | 28.7 g | 36.4 g | 37.0 g of HyHy |
|  | 66% | 83% | 85% yield |
| Lower phase | 10.0 g | 4.0 g | 2.1 g of HyHy |

According to the analytically determined composition of 31.2% of hydrazine hydrate and 98.0% of methylethyl ketone, corresponding to a molar ratio of 1:2.2, the upper, non-aqueous phase consists of about 90% of the azine of methylethyl ketone and about 10% of excess ketone. The ammonia content is less than 0.5% and the sodium chloride content less than 0.1%.

EXAMPLE 4

200 g of NaCl were added to the aqueous ammonia solution of Ex. 3 and instead of the molar ratio (MR) of ketone: active chlorine = 2.2:1 used in example 1 a, molar ratios varying from 1.6:1 to 3.0:1 were used. The following yields of hydrazine hydrate were obtained:

|  | Upper phase 25.7 g HyHy | Lower phase 7.2 g HyHy |
|---|---|---|
| at MR = 1.6 | = 75% yield | |
|  | 79.8 g MEK | 16.0 MEK |
|  | MR = 2.2 | MR = 1.5 |
| at MR = 2.0 | 34.7 g HyHy | 4.4 g HyHy |
|  | = 81% yield | |
|  | 102.0 g MEK | 16.2 g MEK |
|  | MR = 2.1 | MR = 1.8 |
| at MR = 2.5 | 36.8 g HyHy | 3.3 g HyHy |
|  | = 85% yield | |
|  | 123.0 g MEK | 20.1 g MEK |
|  | MR = 2.3 | MR = 4.4 |
| at MR = 3.0 | 38.1 g HyHy | 3.2 g HyHy |
|  | = 87% yield | |
|  | 142.0 g MEK | 32.9 g MEK |
|  | MR = 2.6 | MR = 7.1 |

As in example (3) so also in this example 4 the upper phase consists mainly of the azine of methylethyl ketone (MEK) in addition to some free ketone, and the NaCl content is less than 0.1% throughout.

EXAMPLE 5

6.5 liters of $Cl_2$ per hour diluted with 30 liters of $N_2$ per hour were reacted at 30°C, with vigorous stirring, with an aqueous solution obtained from 1,200 ml of a 25% solution of $NH_3$ in water, 200 g of NaCl and 20 ml of a 0.1% solution of glue and with 140 ml of methylethyl ketone. The pH was kept constant at about 13.0 during the 2 hours of reaction by the addition of a 40% NaOH solution. The reaction mixture obtained separated into two phases. The following results were obtained from analysis:

|  | HyHy | MEK | MR |
|---|---|---|---|
| upper phase | 21.3 g | 64.4 g | 2.1 |
| lower phase | 6.2 g | 20.7 g | 2.3 |
| Total | 27.5 g = | 70% yield. | |

EXAMPLE 6

237 g of chloride of lime containing 27.7% of active chlorine were introduced incrementally with vigorous stirring at 20°C in the course of 1 hour into a solution prepared from 1,200 ml of 25% $NH_3$ in water, 150 g of $CaCl_2$, 200 g of methylethyl ketone and 0.1 g of nitrilotriacetic acid. The reaction mixture was then stirred for a further 20 minutes and left to separate into two phases. The following results were obtained from analysis:

|  | HyHy | MEK | MR |
|---|---|---|---|
| upper phase | 21.7 g | 81.0 g | 2.6 |
| lower phase | 12.0 g | 54.9 g | 3.2 |
| Total | 33.7 g = 73% yield | | |

EXAMPLE 8

A chloramine solution prepared from 300 ml of 10% $NH_3$ in water and 320 ml of bleaching lye (100 g per liter of active chlorine) at −7°C was introduced with stirring into an aqueous mixture kept at 30°C which had been prepared from 1,000 ml of 25% of $NH_3$ in water, 150 ml of methyl ethyl ketone, 380 g of NaCl and 0.1 g of nitrilotriacetic acid. About 100 liters of $NH_3$ gas were introduced in the course of the 1 hour's experiment to replace ammonia losses. The resulting reaction mixture separated into two phases. The following results were obtained from analysis:

|  | HyHy | MEK | MR |
|---|---|---|---|
| upper phase | 16.5 g | 94.0 g | 3.9 |
| lower phase | 2.2 g | 40.8 g | 12.8 |
| Total | 18.7 g = 83% yield. | | |

It will be appreciated that the instant specification and examples are set forth by way of illustration and not limitation, and that various modifications and changes may be made without departing from the spirit and scope of the present invention.

What is claimed is:

1. In the preparation of reaction products of hydrazine and acetone by reacting chlorine or compounds which contain active chlorine with ammonia in the aqueous phase and with a acetone, and thereafter recovering the hydrazine reaction product, the improvement which comprises rendering the reaction medium substantially insoluble for the resulting hydrazine-acetone compound by effecting the reaction in the presence of at least one salt selected from the group consisting of NaCl, $CaCl_2$ and KCl present in such amount that the system separates into an aqueous salt-containing phase and a substantially non-aqueous phase, separating the non-aqueous phase formed containing the reaction product of hydrazine and acetone from the substantially aqueous phase, and recycling said aqueous phase for use in the reaction of further quantities of chlorine with ammonia and acetone.

2. Process according to claim 1, wherein the salt used is NaCl.

3. Process according to claim 1, wherein the salt used is $CaCl_2$.

4. Process according to claim 1, wherein the aqueous phase in which said reaction proceeds is substantially saturated with said salt.

* * * * *